Figure 1:
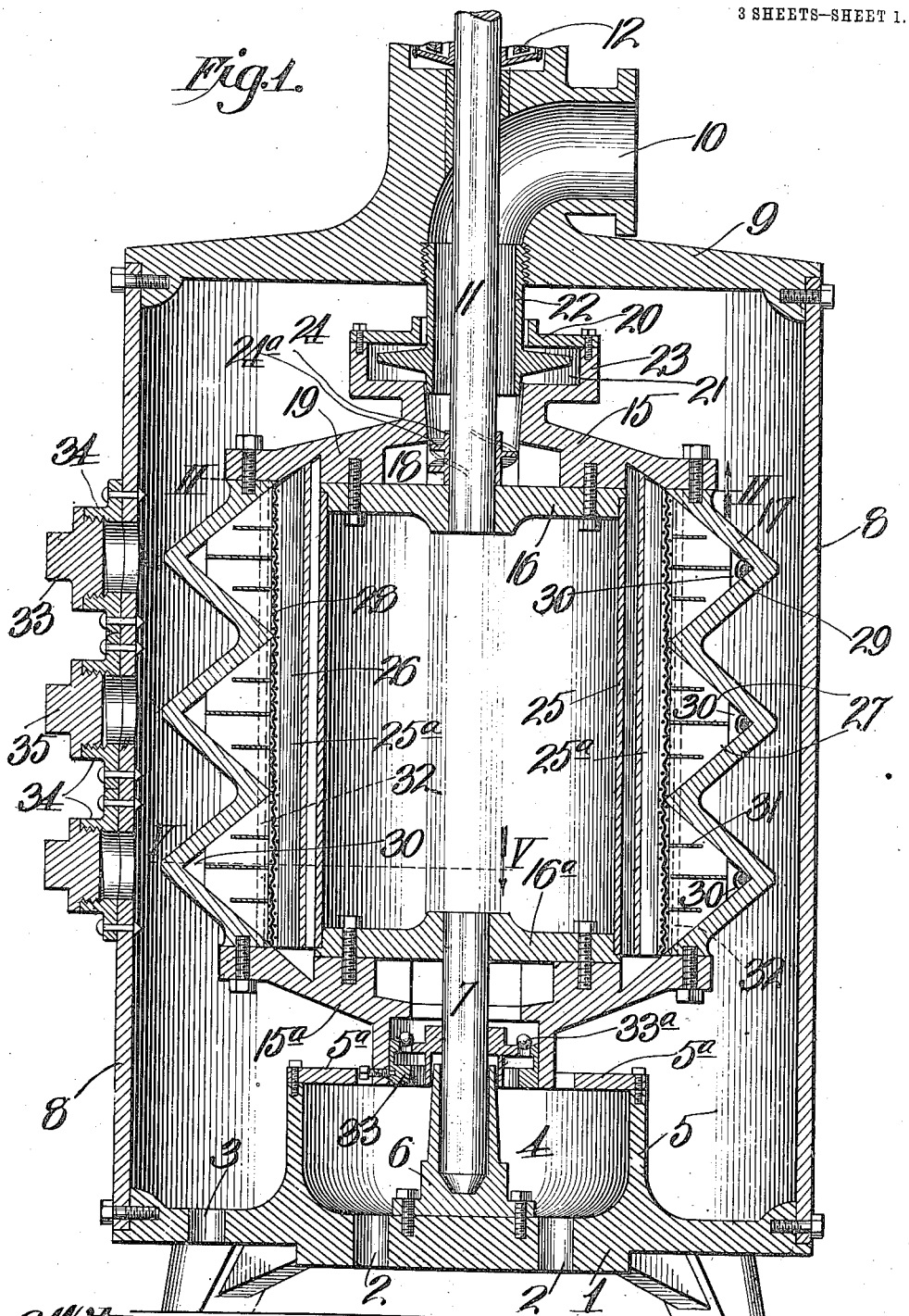

W. K. RICHARDSON.
CENTRIFUGAL WATER CLARIFIER.
APPLICATION FILED DEC. 15, 1910.

1,014,849.

Patented Jan. 16, 1912.

3 SHEETS—SHEET 1.

Witnesses

Inventor
William K Richardson

W. K. RICHARDSON.
CENTRIFUGAL WATER CLARIFIER.
APPLICATION FILED DEC. 15, 1910.
1,014,849.
Patented Jan. 16, 1912.
3 SHEETS—SHEET 3.
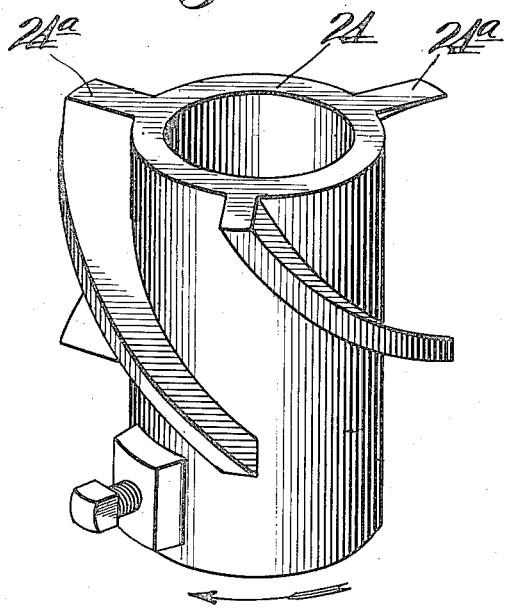
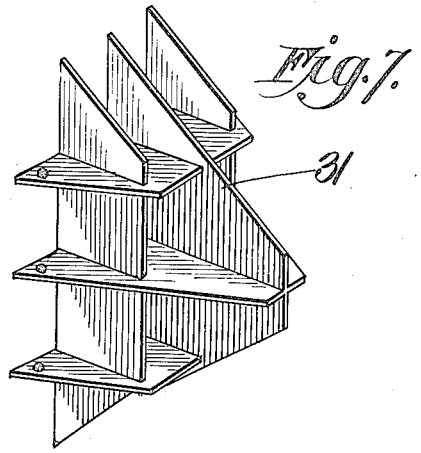
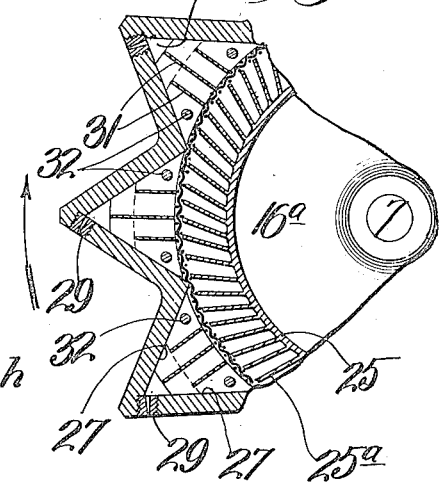
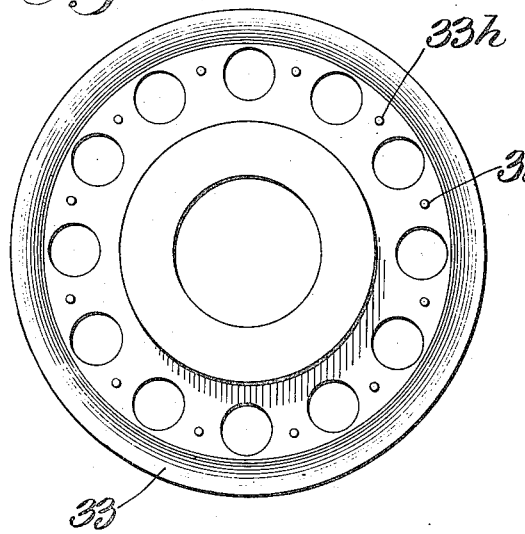
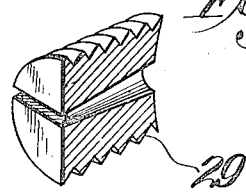
Witnesses
Frank R. Glow
C. P. Rutherford
Inventor
William K. Richardson

UNITED STATES PATENT OFFICE.

WILLIAM K. RICHARDSON, OF LEAVENWORTH, KANSAS.

CENTRIFUGAL WATER-CLARIFIER.

1,014,849.  Specification of Letters Patent. Patented Jan. 16, 1912.

Application filed December 15, 1910. Serial No. 597,581.

*To all whom it may concern:*

Be it known that I, WILLIAM K. RICHARDSON, a citizen of the United States, residing at Leavenworth, in the county of Leavenworth and State of Kansas, have invented a new and useful Centrifugal Water-Clarifier, of which the following is a specification.

This invention relates to certain improvements in mechanical clarification of water. It also relates to the purification of water by removal of organic matter contained therein by centrifugal force.

In view of the state of the art it is deemed necessary to call attention to certain construction and physical conditions which must exist in the clarification and purification of water on a commercial basis, so that it may be of general utility. Great centrifugal force must be employed for the absolute clarification of water. While the sands, mud, and silts are readily subsided by centrifugal force, it is more difficult to precipitate the finer divided and pulverized matter, such as the silts of abrasion, the metallic oxids and bacteria. The water must be in a comparatively quiescent state during precipitation of the impurities. All racing of the fluid, shock and eddy currents must be avoided. The impure water containing the precipitations should be discharged in a direction counter to the direction of rotation for the peripheral velocity of the machine at this point is great and the conservation of power by the proper direction of discharge of the water carrying the precipitants is of great importance to the utility of the machine. The surfaces upon which the precipitants are thrown must have sufficient pitch from a radial line that centrifugal force may deflect the impurities toward suitable discharge outlets, for if the angle of pitch is less than 45 degrees, not assisted by the scouring action of the water, friction and adhesion will hold the precipitants on this surface and they will not be discharged from the machine.

The object of this invention is to produce a machine capable of discharging the precipitants from the machine without employing the scouring action of the water and thus minimize the amount of water necessary to abrade and carry the precipitants, and lessen the agitation of the water due to velocity of flow; to discharge the impurities in a direction counter to tangential direction due to centrifugal force; to provide interchangeable means for these discharge outlets, as their area of cross-section must vary according to the turbidity of the water and the volume of water handled per increment of time considered from an economic standpoint; to discharge the water as near the center of rotation as it is received into the machine; to utilize the centrifugal force of the water within the area of cross-section of the intake of the machine; to provide the priming means in a machine of this character, and also to provide means for a rod or journal packing, in a centrifugal machine that will permit or make practicable the high speed necessary for the purification and clarification of water by centrifugal force.

Figure 2:
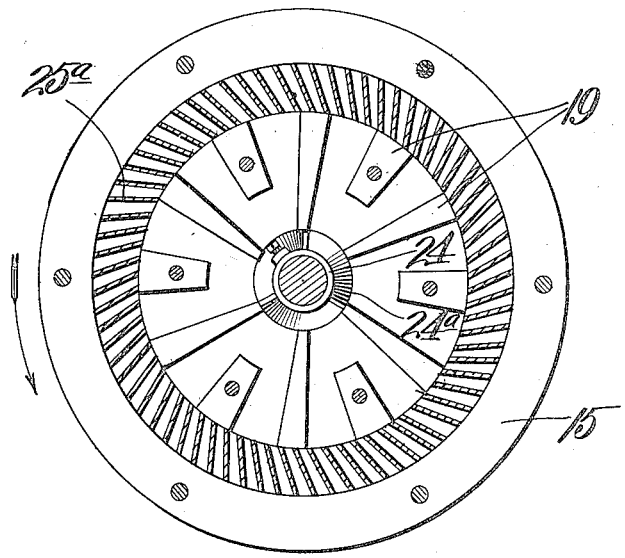
Figure 3:
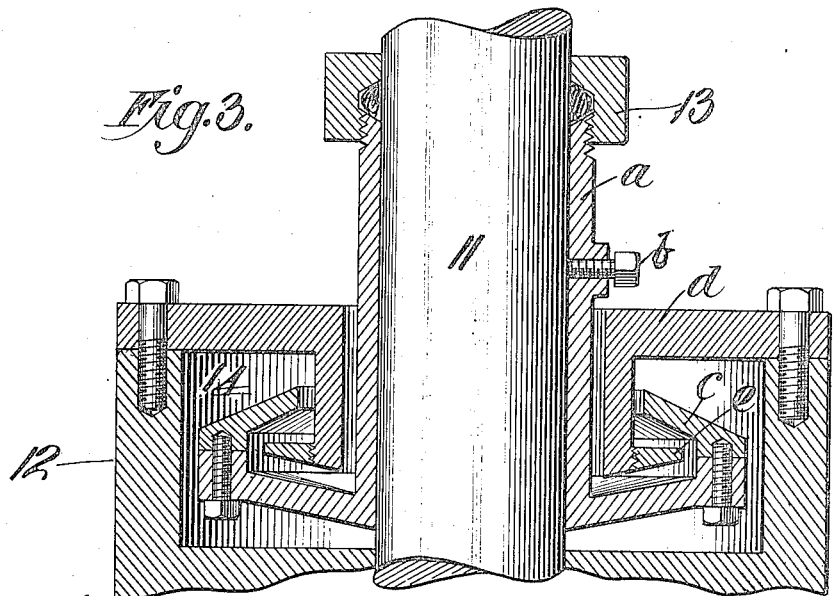

With these objects in view my invention consists in the construction and combination of parts as hereinafter described and claimed, of which:

Figure 1, is a vertical cross-section of my machine; Fig. 2, is a section on line 11—11 of Fig. 1; Fig. 3, is a vertical cross-section on an enlarged plan showing liquid seal with packing gland which is omitted in Fig. 1; Fig. 4, is perspective of impeller worm; Fig. 5, is a fractional horizontal section, omitting the outer casing, through the apex of prisms, showing position of nozzles and baffle plates; Fig. 6, is top view of centrifugal valve omitting the balls; Fig. 7, is a perspective view of assembled baffle plates used in pockets 30; Fig. 8, is a cross-section lengthwise of one of the mud nozzles.

1, indicates baseplate, having discharge openings 2, for pure water, and discharge opening 3, for impure water; 4, is circular retaining basin, having a vertical wall 5, cast integral with base-plate 1, as shown in Fig. 1; 6, is a step to carry the shaft 7, to which is attached the rotating parts of the machine; 8, is a steel shell, bolted to the base 1, and the top 9, and forms the outer casing of the machine, the top 9, having an intake 10.

The central portion of 9 is cored in the casting and when babbitted receives shaft 11, which is provided at top of member 9 with centrifugal liquid seal 12, shown in Fig. 3, the operation and description of which are as follows: The thimble "*a*" which slips over shaft 11 is retained in position after adjustment by set screw "*b*", the upper end of the thimble being threaded for the reception of packing gland 13, and is for the purpose of preventing the passage of air between the shaft 11, and the thimble "a", the lower portion of member "a" has an upward inclined annular projection to which is bolted the centrally perforated disk "c," forming a V shaped pocket or chamber. The top of casing 9, is cored out to form the chamber 14, in which the members "a" and "c" rotate, on the upper portion of member 9 is bolted the member "d" which forms the top of chamber 14, having a downward flange at its perforation, and provided with a left-hand thread on its lower periphery for the reception of ring "e". Mercury is used in this centrifugal liquid seal, oil could be used but member "e" is rather small to resist the effect of a high vacuum.

The operation of this device is as follows: Mercury is poured into the V shaped chamber until about ⅔ full, the clearance between members "a" and "d" is then filled with water; when the machine is put in motion centrifugal force holds the liquid to the outer extremity of the V shaped pocket, atmospheric pressure tending to force air through the clearance passage between members "a" and "d," drives a portion of the mercury in the passage formed by members "a" and "e" toward the periphery of the disk "e," thus shortening the column of liquid on the lower side of "e" and increasing it on the upper side, causing an unbalanced column of liquid acted upon by centrifugal force alone, on the other side counter-balanced by a shallow or less length of liquid acted upon by the components, centrifugal force and atmospheric pressure, said atmospheric pressure corresponding to the degree of vacuum sustained by the lift of the suction.

This device provides a perfect seal, is comparatively frictionless and requires no attention, there is no wear nor heating of the parts where any of the present means are employed to accomplish the same results, viz. the maintenance of a vacuum, it conserves power and makes practicable high speed machines of this character, for the machine is constantly changing its center of gravity and a vibratory action therefore takes place, due to the unequal distribution of the sedimentation on the deflecting surfaces of the machine, which is caused principally by the difference in character of the precipitants, for the water varies in its percentage of sand, mud, silts and organic matter and all of them have their own individual co-efficient of friction and specific gravity; at times the planes are absolutely purged of precipitants, at other times they are somewhat foul.

The rotating parts within the outer casing constitute the purifying cylinder of this machine, of which 15, indicates the top, to which is bolted the steel pocket casing 17, and driver 16. The driver 16 is a disk, having a shoulder turned on its inner face at periphery, and also provided on this face with a shaft hub centrally perforated to receive shaft 11, which is pressed therein and rigidly retained. By bolting driver 16 to member 15, the impeller chamber 18 is formed.

The impeller blades which are indicated by 19 are cast integral with top 15; their construction and position are shown in Fig. 2, and their function is similar to any inclosed type of single impeller centrifugal pumps, viz; to prevent racing of the fluid and to subject the water without slippage to the rotary velocity of the machine.

On the upper extremity of member 15 is bolted an annular disk 20, centrally perforated and flanged upward as shown in Fig. 1, the chamber 21 thus formed is cored in the casting 15 and is for the purpose of receiving the disk end of sleeve 22; on the upper end of sleeve 22 is cut a left hand thread, which engages the bottom central opening in top 9; the lower end of sleeve terminates with a horizontal rim beveled on both surfaces and accurately turned, forming a disk, as shown in Fig. 1, which remains stationary. When the machine is primed, water floods chamber 21, the water therein being acted upon by centrifugal force when the machine is in operation, resists the passage of air over the periphery of member 22, as it enters the passage way between members 20 and 22, constituting a centrifugal liquid seal 23. In the central bore of member 15 and over the shaft 11 is slipped the screw 24, as shown in Fig. 1. A profile view of screw 24 is shown in Fig. 4; said screw consists of a central web forming a sleeve, to which is cast the projecting helical blades 24$^a$ forming a worm, their angle of pitch being opposite to the direction of rotation. The object of the screw is to utilize the centrifugal force of the water within the area of intake, or central bore of member 15, and its specific construction prevents the passage of water due to centrifugal force, from reducing or destroying the action of suction, by forcing the water in the direction of flow.

25 indicates a sleeve, which fits into the recesses or shoulders turned on the inner faces of peripheries of members 16 and 16$^a$, and forms the inner wall of the purifying chamber 26; attached to sleeve 25 are baffle plates 25$^a$ as shown in Figs. 2 and 5, these baffle plates extend throughout the length of chamber 26 in a vertical position and across said chamber at about 44 degrees from a radial line to the base of inner extremity of deflecting surfaces 27; surrounding baffle plates of sleeve 25 is a perforated brass or wire screen 28; its purpose is to destroy eddy currents, which would be set up by the water flowing through a passage of alternating area of cross-section, and a further object is to catch any extraneous matter such as chips, fiber, etc., improperly or unavoidably introduced, to prevent such matter from clogging the mud nozzles 29, shown in Fig. 5, located in the apex of pockets 30 in member 17; said mud nozzles 29 are substantially the frustum of a cone, threaded on beveled surface, concave at small or inner end, screwdriver slot on base or large end, they are also provided with a conical, central, longitudinal perforation; they are made of steel and case hardened. These mud nozzles have small discharge openings, varying in size according to the size of the machine, and are screwed into the apex of the pockets 30 of member 17 at about 45 or 50 degrees of a radial line; the size of the orifice in these nozzles is determined by the volume of water desired to pass through them, necessary to abrade and carry the impurities, and it should be borne in mind that the water, at this point, is under great pressure; they are case hardened to better resist the scouring action of the water, and are set at an angle as above stated for the purpose of discharging the poluted waters, counter to tangential direction due to centrifugal force, and thus a large percentage of energy absorbed by the water, and precipitants, at the peripheral discharge is conserved.

Within the pocket 30 which is formed by the deflecting surfaces of member 17, are placed baffle plates 31. Their position and construction are shown in Figs. 1, 5, and 7, and are retained in position by vertical rods 32, passing through the horizontal plates as shown in Fig. 5. Their purpose is to lessen the impact of the water on the driving side of the deflecting surface of pockets 30 and also to destroy eddy currents. In the discharge end of member 15$^a$ is placed an automatic valve 33, which consists of a bushing turned to fit into the recess of member 15$^a$, this bushing is centrally perforated for the reception of shaft 7 under a driving pit, the lower half of the bushing being cored in the casting to form the annular chamber as shown in Fig. 1, leaving a central hub which is bored out sufficiently large for the introduction of the upper end of step 6; the band or annular ring thus formed prevents the water from entering the step bearing.

The upper portion of the bushing has a central hub or projection from the base of which a horizontal surface extends within a short distance of the priphery; this horizontal surface is perforated with a plurality of holes accurately spaced and reamed, the diameter of these holes should be less than the diameter of the balls used; extending from the outer edge of these ports, the bushing is turned so as to form an annular upward-deflected surface of such pitch, that, when the balls are lifted from their seat and moved outward by centrifugal force, the center of gravity of the balls will be within a perpendicular line drawn from their point of support, so the balls will fall back into their seat somewhat before the rotation of the machine ceases. Balls 33$^a$ should be of hard bronze absolutely spherical and of a diameter directly as the size of the machine and inversely as the speed. They should not seat low enough to wedge. Midway between the balls 33$^a$ studs 33$^b$ are inserted into the bushing as shown in Fig. 6, and are for the purpose of preventing bunching and racing of the balls.

On the outer casing 8, and immediately opposite the mud nozzles 29, are placed flanges 34, surrounding holes in the outer casing of sufficient size through which the operator may reach and withdraw or change mud nozzles 29, when necessary; said flanges being provided with plugs 35. The following is the operation of this machine, which is preferably electrically driven by direct flexible connection to shaft 11; when the suction pipe (not shown) which is provided with the usual foot valve at the source of supply, and a T at the point of connection is bolted to elbow 10, water is introduced into the machine, and the suction pipe, until both are filled; the water for this purpose should be supplied, either from a suitable stand-pipe or reservoir, under hydraulic head, or sufficient elevation that the water will flow by gravity into the machine. The motor is then started, the water that flows out of the mud-nozzles, until the machine has attained about one half speed, is supplied from the stand-pipe or reservoir; when the machine has attained this speed the valve to stand-pipe or reservoir is closed, and the machine takes water under suction, as at about this speed the automatic valve operates, that is centrifugal force is sufficient to raise the balls 33$^b$, from their seat and also centrifugal force of the liquid, in both liquid seals, at this speed, is sufficient to resist the action of suction, and no air will enter the machine. As the water enters the machine it is immediately subjected to centrifugal force, by the repulsive action of the worm 24$^a$, and the impeller blades 19; as the water leaves the impeller chamber 18 it enters the upper end of purifying chamber 26, under a low velocity of flow, as the area of cross-section at this point is about four times greater than the area of the intake above the worm 24.

The tendency of the water to race as it enters the chamber 26, which is farther removed from the center of rotation than the outer end of impeller blades 19, is prevented by baffle plates or webs 25$^a$, and as the velocity of flow is low, a corresponding slight impact upon their impelled sides occurs, thus avoiding shocks and eddy-currents; as the water starts downward it has attained its maximum velocity of flow in chamber 26 and at this point a greater part of the solid matter contained in the water is precipitated by centrifugal force; as the water flows downward and outward its velocity gradually diminishes, and owing to the angle at which the baffle-plates 25ᵃ are set and the intervening space between them, every portion of water contained in chamber 26 is brought in contact with the driving side of a baffle-plate, where it deposits any foreign matter that it may contain, the adhesion of this material to the plate depends upon its character, and as it accumulates its density is increased, for it is subjected to the centrifugal force of its own gravity under accumulation, this force overcomes adhesion to the plate and it is deflected along the baffle-plate downward and outward, downward at the rate or velocity of flow of the water in that direction, outwardly at a velocity corresponding to the specific gravity of that material acted upon by a predetermined centrifugal force, assisted by the water flowing in an outwardly direction.

The turbid water on the driving side of the baffle-plates due to the scouring effect, is entirely local and does not pollute the waters beyond this immediate region; the concentration and accumulation of the finely divided matter has increased its density and centrifugal force tends to hold it against this surface in the process of its travel in chamber 26, these precipitants pass through screen 28 and are delivered into pockets 30 where they are subsided and deflected toward suitable discharge outlets 29, which are so placed that the issuing water, carrying the precipitants, will jet in a direction counter to direction of rotation, and as the water will have a spouting velocity equal to the peripheral speed of the machine at this point, caused by its hydrostatic pressure, due to the centrifugal force the available energy thus conserved is apparent. When the water reaches the lower extremity of chamber 30, it is purged of all impurities capable of removal by centrifugal force. As the water flows through chamber 23ᵃ toward the center of rotation, the impeller blades 19ᵃ act as an impact wheel or turbine, for the water entering at their periphery loses its rotary velocity as it flows inward, and the impact upon these blades in the direction of rotation, assists in driving the machine, or in other words, this impact in the direction of rotation, equals the energy absorbed by the impeller blades 19, in subjecting the water to centrifugal force, less friction, and loss due to the velocity of discharge.

This machine must be primed as previously described after every stop of the machine, as the machine will hold its priming only during operation. The liquid seal shown in Fig. 3, is not herein specifically claimed, the same being shown and specifically claimed in my co-pending application Serial No. 626,848, filed May 12th 1911.

I claim:

1. In a centrifugal water clarifier, a rotary vessel in which separation takes place contained within a shell, provided with a centrifugal liquid seal, said vessel having an inlet provided with a centrifugal liquid seal, an outlet, a centrifugal actuated valve controlling said outlet, a chamber having outwardly tapering pockets provided with jet orifices at their diminished ends, said chamber provided with baffle plates surrounded by a strainer through which water must pass to reach the jet orifices of the pockets.

2. In a centrifugal water clarifier, a rotary vessel in which separation takes place contained within a shell, provided with a centrifugal liquid seal, said vessel having an inlet provided with a centrifugal liquid seal, an outlet, a centrifugal actuated valve controlling said outlet, a chamber having outwardly tapering pockets provided with jet orifices at their diminished ends, skeleton frames fitting into said pockets, said chamber provided with baffle plates surrounded by a strainer through which water must pass to reach the jet orifices of the pockets.

3. In a centrifugal water clarifier, a rotary vessel in which separation takes place contained within a shell, provided with a centrifugal liquid seal, said vessel having an inlet, provided with a worm, and also provided with a centrifugal liquid seal, an outlet, a centrifugal actuated valve controlling said outlet, a chamber having outwardly tapering pockets provided with jet orifices at their diminished ends, skeleton frames fitting into said pockets, and consisting of a plurality of vertical, and a plurality of horizontal plates secured together, said chamber provided with baffle plates surrounded by a strainer through which water must pass to reach the jet orifices of the pockets.

4. In a centrifugal water clarifier, a rotary vessel in which separation takes place, having an inlet, an outlet in communication with a chamber, said chamber provided with baffle plates having an angle of pitch in the direction of rotation as and for the purpose specified.

5. In a centrifugal water clarifier, a rotary vessel in which separation takes place, having an intake, an outlet in communication with a chamber, the outer walls of said chamber forming pockets, constituting deflecting surfaces converging to discharge outlets as and for the purpose specified.

6. In a centrifugal water clarifier, the combination with the outer casing provided with intake and discharge ports at opposite ends, a depending sleeve having a disk enlargement at its lower end secured to the intake port, of a rotary vessel contained within said outer casing, provided with intake and discharge ports at opposite ends, the intake port of said rotary vessel provided with a chamber adapted to receive the disk end of said depending sleeve, and also adapted to receive a liquid and retain it under centrifugal force, for the purpose of effecting a seal between the rotary and stationary members of said chambers.

7. A centrifugal water clarifier, comprising a vertical shaft having a cylindrical enlargement, a vessel bearing a concentric relation to and inclosing said enlargement, and provided with end openings through which the shaft extends, the upper opening constituting an intake port and the lower a discharge port of the vessel; the same having outwardly tapering peripheral pockets having jet orifices at their diminished ends, a valve for the discharge port adapted to open when the vessel is rotating at a predetermined speed and close when the revolution of the vessel falls below such speed.

8. In a centrifugal water clarifier, a rotary vessel in which separation takes place, said vessel provided at one end with an intake, and at the opposite end with a discharge port, a perforated partition in said discharge port, and balls seated in the perforations thereof when not centrifugally actuated.

9. In a centrifugal water clarifier, a rotary vessel in which separation takes place, having an inlet, an outlet, in communication with a chamber provided with baffle plates surrounded by a screen, the outer walls of said chamber forming pockets, skeleton frames fitting into said pockets, and a discharge orifice in the reduced end of the pockets.

10. A centrifugal water clarifier, comprising a vertical shaft having a cylindrical enlargement, a vessel bearing a concentric relation to and inclosing said enlargement, and provided with end openings through which the shaft extends, the upper opening constituting an intake port and the lower a discharge port for the vessel; the same having outwardly tapering peripheral pockets, means whereby the stationary and rotary members of the intake port are closed by a liquid seal when the vessel is rotating, a centrifugal actuated valve for the discharge port adapted to open when the vessel is rotating at a predetermined speed and closed when the revolution of the vessel falls below said speed, and means within the vessel to subject water passing downward through the intake port into the vessel to centrifugal force.

11. A centrifugal water clarifier, comprising a vertical shaft having a cylindrical enlargement, a vessel bearing a concentric relation to and inclosing said enlargement, and provided with end openings through which the shaft extends, the upper opening constituting an intake port and the lower a discharge port for the vessel; the same having outwardly tapering peripheral pockets, means within the vessel to subject water to centrifugal force, and baffle plates within the vessel having an angle of pitch in the direction of rotation to intercept the impurities and check the water entering the vessel under centrifugal force.

12. A centrifugal water clarifier comprising a casing having an internal basin at its lower end and openings in its bottom, a vertical shaft extending through the casing and suitably journaled at its lower end, and projecting beyond the top of the casing, a vessel within the casing provided with an intake port at its upper end through which the shaft extends and a discharge port at its lower end to discharge into the basin and through which the said shaft also extends; said vessel having outwardly tapering pockets having jet orifices at their diminished ends to discharge into the casing exterior of the basin, means for creating a water seal between the stationary and rotary members of the intake port, a perforated partition in the exhaust port, and balls resting on said partition and normally seated in the perforations thereof, and adapted when the vessel is rotating to roll outward and expose said perforations, and when the speed of rotation diminishes sufficiently to roll inward and reclose said perforations.

WILLIAM K. RICHARDSON.

Witnesses:
W. L. RICHARDSON,
C. P. RUTHERFORD.